US006766701B2

United States Patent
Norling et al.

(10) Patent No.: US 6,766,701 B2
(45) Date of Patent: Jul. 27, 2004

(54) LOAD CELL

(75) Inventors: Fredrik Norling, Mölnlycke (SE); Åke Persson, Västerås (SE)

(73) Assignee: ABB AB, Västerås (SE)

( * ) Notice: Subject to any disclaimer, the term of this patent is extended or adjusted under 35 U.S.C. 154(b) by 99 days.

(21) Appl. No.: 10/260,389

(22) Filed: Oct. 1, 2002

(65) Prior Publication Data

US 2003/0029253 A1 Feb. 13, 2003

Related U.S. Application Data

(63) Continuation of application No. 09/719,869, filed as application No. PCT/SE99/01116 on Jun. 21, 1999, now abandoned.

(30) Foreign Application Priority Data

Jun. 26, 1998 (SE) ............................................... 9802273

(51) Int. Cl.[7] ............................................... G01L 1/04
(52) U.S. Cl. ............................................... 73/862.632
(58) Field of Search ................... 73/862.629, 862.632, 73/862.633, 862.634, 862.636, 862.637, 862.638

(56) References Cited

U.S. PATENT DOCUMENTS

| | | | | | |
|---|---|---|---|---|---|
| 4,522,066 A | * | 6/1985 | Kistler et al. | ................. | 73/781 |
| 4,657,097 A | * | 4/1987 | Griffen | ........................ | 177/211 |
| 4,813,504 A | * | 3/1989 | Kroll | ............................ | 177/21 |
| 4,911,024 A | * | 3/1990 | McMaster | .............. | 73/862.045 |
| 5,220,971 A | * | 6/1993 | Farr | ............................. | 177/229 |
| 5,604,336 A | * | 2/1997 | Johnson | ..................... | 177/229 |

* cited by examiner

Primary Examiner—Max Noori
(74) Attorney, Agent, or Firm—Dykema Gossett PLLC

(57) ABSTRACT

A load cell comprising a load carrying structural framework is arranged with two measuring zones (20, 21) where a measuring means is arranged on each. A load applied to two parallel outer beams (10, 11) of the framework is transferred to a third parallel measuring beam (17) arranged with a measuring zone (20) by connecting beams (12, 13). The connecting beams (12, 13) make an angle α to the long axis of the measuring beam (17). The load on the measuring zone (20) is greater than the applied load on outer beams (10, 11) in proportion to the angle α. A preferred embodiment of the load cell comprises a membrane (34) joining each measuring zone (20, 21). In a load cell according to a preferred embodiment of the invention measuring zones (20, 21) are defined by passageways (43–48) and slits (35–38) running from one side of the load cell to the other in the z-direction. A load to be measured is applied in the y-direction. The load cell according to the invention is insensitive to the effects of temperature gradients across the load cell in either the x- or y-direction.

26 Claims, 4 Drawing Sheets

LOAD CELL

CROSS-REFERENCE TO RELATED APPLICATIONS

This application is a continuation of application Ser. No. 09/719,869, filed Feb. 15, 2001, now abandoned which was a U.S. national phase of PCT/SE99/01116, filed Jun. 21, 1999, which derived from Swedish Application 9802273-4, filed Jun. 26, 1998. All priorities are claimed.

TECHNICAL FIELD

The present invention relates to the measurement of force for industrial applications. It concerns the use of load cells for continuous measurement of forces such as weight or pressure, including the measurement of tension in web or sheet materials. More specifically the Invention is a new load cell.

BACKGROUND ART

Within many industrial areas it is necessary to measure accurately the magnitude of a force. An example of a load cell for the measurement of a force in a vertical direction is known. A load cell is arranged with two beams that are substantially thinner than the remainder of the load cell. Each of the beams has a measuring zone equipped with a measuring means. As a result of a vertical load F on the load cell a shear force due to F/2 is applied to the beam. Force in the measuring zone of the beams as a result of a vertical load is measured by a magnetoelastic sensor of the Pressductor type.

This load cell has a long service life, tolerates overloads well and performs accurately in service. This load cell requires a certain minimum load in order to generate a useable measurement signal, and its accuracy can be affected by temperature gradients across the load cell.

SUMMARY OF THE INVENTION

The object of the invention is to provide a load cell that measures loads accurately. A further object of the invention is to provide a load cell that measures small loads accurately. A still further object of the invention is to provide a load cell in which the effects of temperature gradients across the load cell are minimized.

A load cell according to the invention comprises a structural load-carrying framework of beams and joints arranged with one or more measuring zones. The structural load-carrying framework is arranged so that a load applied to two parallel outer beams of the framework is transferred to the measuring zones via connecting beams. At least one connecting beam is arranged at an angle α to the two parallel outer beams. The load applied to the structural load-carrying framework is transferred to the measuring zone as a load which is greater, smaller or the same as the applied load, in proportion to the angle α.

A load cell according a preferred embodiment of the present invention is shaped externally as a solid and substantially rectangular block. Inside the substantially rectangular block the load cell is further shaped such that the load on two parallel outer beams of the load cell is applied to two measuring beams equipped with measuring zones arranged in the load cell and joined together by a membrane. Each of the measuring beams equipped with measuring zones is subjected to a tensile or compressive load in the direction of the long axis of the beam. The measuring beams are positioned on either side of a membrane in a preferred embodiment of the load cell.

The load transferred to each measuring beam in the area where the measuring zone is arranged is greater, smaller or the same as the external load on that part of the load cell. Through a type of leverage action, relatively small loads may be measured. The leverage is in proportion to the angle α between connecting beams in the load cell and a long axis of parallel outer beams arranged in the framework. A measuring means is arranged on each measuring zone to generate a signal proportional to the mechanical strain imposed on the measuring zone. A preferred embodiment of the invention comprises two measuring beams on either side of a membrane where a measuring signal is taken from a measuring zone arranged on each beam.

The advantage of the present invention is that the shape and geometry of the load cell makes it sensitive to small loads in a y-direction. A further advantage is that the two beams arranged with measuring zones are joined and arranged with an asymmetric geometry that makes the load cell insensitive to temperature gradients in two directions, one direction parallel to the long axis of the beam, the x-direction, and another direction perpendicular to it. Temperature gradients across the load cell in a straight line in the y-direction cause changes in signal from measuring zones on the two beams which cancel each other out. The same is true for temperature gradients across the load cell in the x-direction.

A still further advantage of the invention is that extension under load in the direction perpendicular to the long axes of the parallel outer beams is extremely small. A yet still further advantage includes that a given size of load cell according to the invention may thus be used to measure a wider range of loads. An additional further advantage of the invention is that the shape and geometry makes the load cell insensitive to loads parallel to the long axis of the parallel outer beams.

BRIEF DESCRIPTION OF THE DRAWINGS

The present invention will be described in more detail in connection with the enclosed drawings.

DESCRIPTION OF THE PREFERRED EMBODIMENTS

Figure 1:
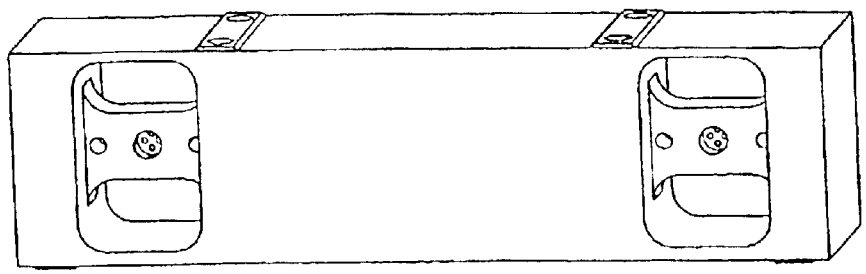
FIG. 1 shows an isometric view of a vertical load cell according to prior art.
Figure 2:
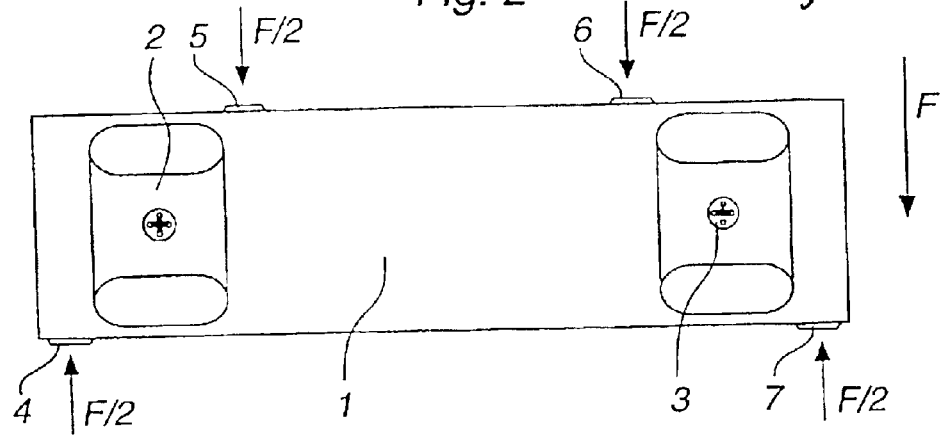
FIG. 2 shows a vertical load cell according to prior art.

An example of a load cell from the prior art is shown in FIGS. 1 and 2. Referring to FIG. 2, the load cell 1 is in the form of a substantially rectangular block, shown schematically with two beams 2 arranged as membranes for measurement of a load applied to the cell in a y-direction as indicated by F. The load F applied to the load cell through shoulders 4, 5, 6, 7 is divided between the two measuring zones of the load cell as two equal loads of F/2. The two beams 2 are substantially thinner in cross section in the z-direction than the remainder of the load cell. A magnetoelastic sensor 3 is arranged on each of the beams 2. A load applied in the direction F is experienced as a shear force due to F/2 in the beams 2, and measured by the magnetoelastic sensor 3.

Figure 3:
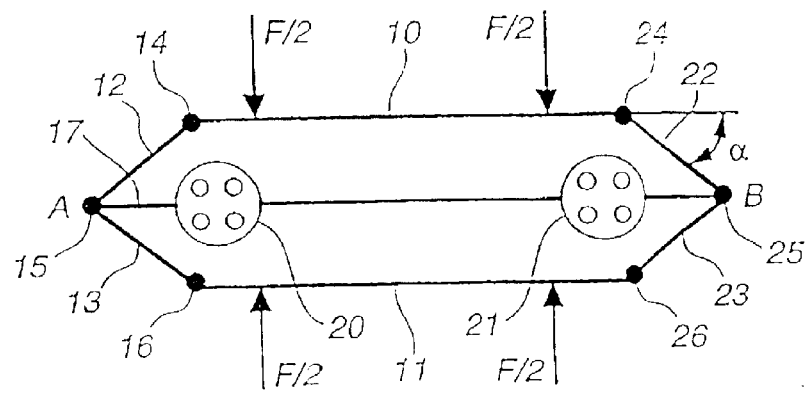
FIG. 3 shows a load cell comprising a framework according to the invention.

FIG. 3 shows a load cell comprising a framework according to the present invention. The framework is represented by beams shown as thick lines and joints drawn as solid circles. The framework comprises beams 10, 11, 12, 13, 17, 22, 23 and joints 14, 15, 16, 24, 25, 26. Two parallel outer beams 10, 11 bear an applied load. The two parallel outer beams 10, 11 are connected by connecting beams 12, 13, 22, 23 to a parallel measuring beam 17 with measuring zones 20, 21 arranged on it. The connecting beams 12, 13, 22, 23 make an angle α to the two parallel outer beams (10, 11). A load of F applied in the y-direction to a parallel outer beam 10 above a measuring zone 20 is divided into two applied loads of F/2 but transferred to the measuring zone as a load in the x-direction greater, smaller or the same as F/2. The angle α determine the proportion between the load on the measuring zone and F/2.

Figure 4:
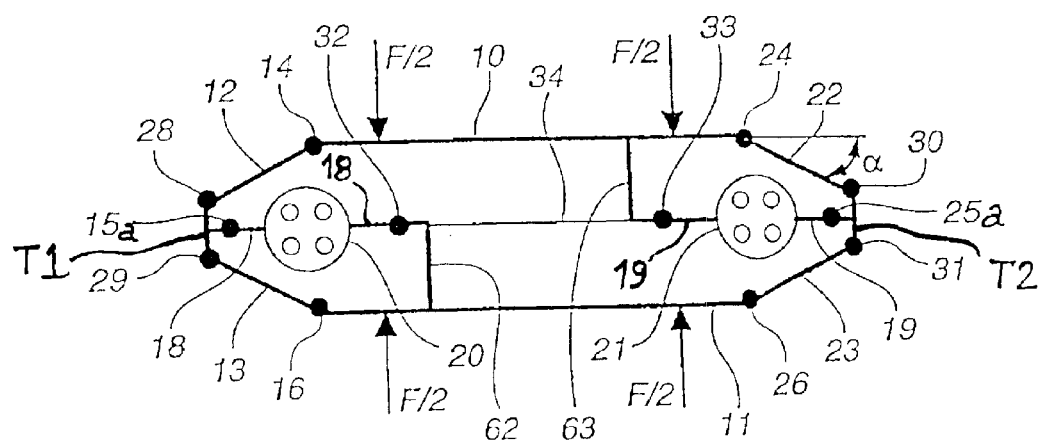
FIG. 4 shows a load cell comprising a framework according to a preferred embodiment of the invention.

FIG. 4 shows a preferred embodiment of a load cell according to the invention in which two measuring zones 20, 21 arranged on measuring beams 18, 19 are mechanically linked to each other by a membrane 34. Additional joints 32, 33 and beams 62, 63 are arranged in the framework of FIG. 4 compared to FIG. 3 linking the two parallel outer beams 10, 11 to the measuring beams 18, 19 and stiffening the framework horizontally. The beams 62, 63 are also placed such that the measuring zones 20, 21 on two measuring beams 18, 19 are arranged asymmetrically in respect to each other about the membrane 34 of FIG. 4. Instead of the connecting beams 12 and 13 being connected to the measuring beam 18 by a single flexible joint, they are connected by a T-shaped connection means T1 which is connected to connecting beam 12 by joint 28, to connecting beam 13 by joint 29, and to the measuring beam 18 by joint 15a. Similarly, the connecting beams 22 and 23 are connected to the measuring beam 19 by a T-shaped connection means T2 which is connected to the connecting beam 22 by joint 30, to the connecting beam 23 by joint 31, and to the measuring beam 19 by joint 25a.

Figure 5:
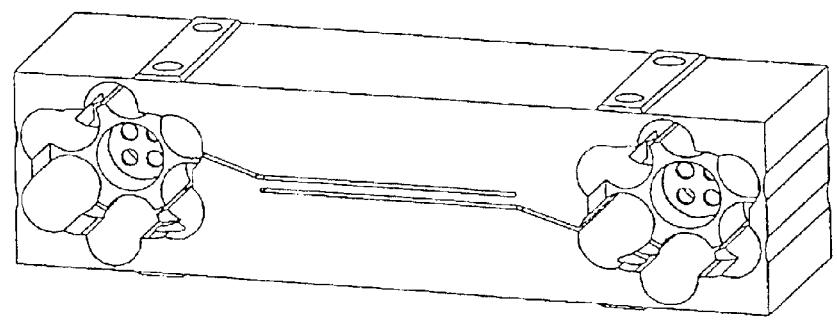
FIG. 5 shows an isometric view of a load cell according to the invention.
Figure 6:
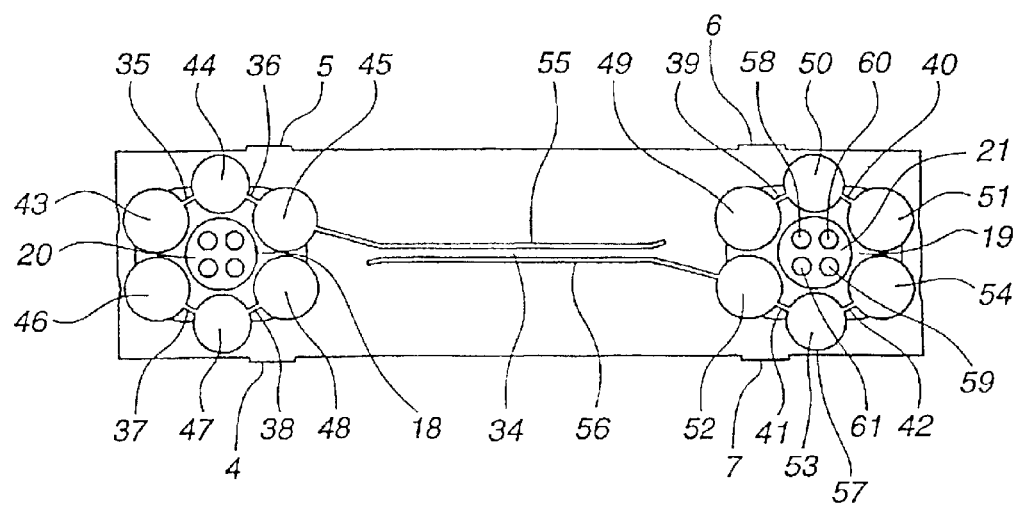
FIG. 6 shows a schematic view of a load cell according to the invention.

FIG. 5 shows an isometric view of a load cell according to a preferred embodiment of the invention. The load cell of FIG. 5 is a substantially rectangular shaped block that corresponds to the preferred embodiment of a load cell comprising a framework shown in FIG. 4. In FIG. 6 the load cell is described in detail. The load cell is shaped internally such that it comprises two measuring zones 20, 21. The measuring zones 20, 21 are defined in the solid material of the load cell by slits 35–42, and passageways 43–54. The slits 35–42 run through the solid material of the load cell in the z-direction. The passageways 43–54 are cylindrical holes bored through the solid material of the load cell in the z-direction from one side of the load cell to the other. The angle α between a connecting beam 12 and the outer beam 10 of the present invention of FIG. 3 is described in the preferred embodiment in FIG. 6 by a tangent drawn between the circumferences of two adjacent passageways 43, 44 and the centre line of measuring beam 18.

In FIG. 6 two pairs of shoulders 5, 6 and 4, 7 are arranged on two parallel sides of the central section of the load cell. A load F on the load cell is divided by the shoulders 4–7 into two equal loads of F/2 which are applied to the measuring zones 20, 21. This is similar to the loads of F/2 applied to measuring zones in the prior art device shown in FIGS. 1, 2.

In embodiments of the present invention shown in FIGS. 5 and 6 the applied load F is also divided into two loads of F/2 applied to the load cell, with the very important difference that the load transferred to the measuring beam arranged with the measuring zones 20, 21 is dependent on the angle α.

Examining one measuring zone 20 in detail, referring to FIG. 6, the six passageways 43–48 are placed such that thin sections of material remaining between the passageway and the edges of the load cell, and between two separate, adjacent but not connected passageways such as 43, 46 of measuring zone 20, form the mechanical equivalent of joints such as joint 15a of FIG. 4. There are six such joints formed by the passagewayS that surround each measuring area. Only one such joint 57 is indicated in FIG. 6 for reasons of clarity.

The slits such as slits 35–38 and 39–42 shown in FIG. 6 joining the passageways and the slits 55, 56 defining the measuring zones 20, 21 and the membrane 34 may be described as plain cuts represented by planes in the z-direction.

Figure 7:
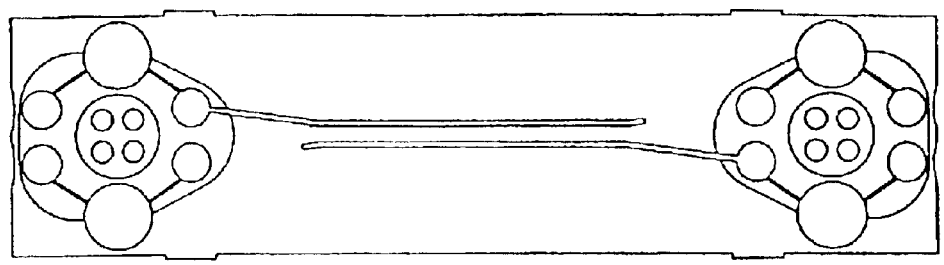
FIG. 7 shows a development of a load cell according to the invention.
Figure 8:
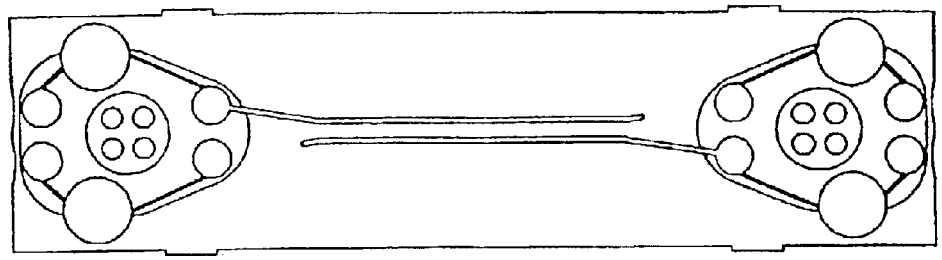
FIG. 8 shows an additional development of a load cell according to the invention.

FIG. 7 shows a load cell according to a development of the invention so shaped as to measure nominal loads of about 2.5 times as great as those for the load cell shown in FIG. 6. FIG. 8 shows another load cell according to a development of the invention so shaped as to measure nominal loads of about 5 times as great as those for the load cell shown in FIG. 6. These different nominal loads have been achieved by changing the angle alpha α.

A measuring zone 20, 21 in the load cell according to the invention is further shaped such that it is relatively thin in the z-direction. This may be seen in the isometric view of the load cell in FIG. 5. The shaping of the load cell is carried out using a milling process or a water jet abrading process or other suitable process for accurately removing metal from a solid rectangular block of a suitable metal, for example a type of stainless steel. A measuring means for strain measurement is arranged on the thin part in the load cell that forms the measuring zones 20 and 21. The measuring means is preferably a magnetoelastic sensor of the Pressductor type, as indicated in FIGS. 3–8.

The operation of a magnetoelastic sensor of the Pressductor type is based on the fact that the magnetic permeability of a magnetic material changes under mechanical stress. This type of sensor is machined in the material of a load cell. Primary and secondary windings are wound through four holes in the load cell material so that they cross at right angles. Two holes in, for example, positions 58, 59 are provided for a primary winding for magnetisation of the material with alternating current. Two more holes in, for example, positions 60, 61 are provided for a secondary winding for measurement of voltages that arise due to an imposed load. The magnetoelastic sensor of the Pressductor type is indicated with reference numbers in only one example in FIG. 6 for the sake of clarity.

A measuring means for strain measurement may also be arranged on the measuring zone in the form of strain gauges or piezo-electric devices.

It is within the spirit of the invention that the cylindrical passageways 43–54 bored through the solid load cell may alternatively have cross sections other than round circles, and that some of the cross sections of the passageways may be of a different shape.

What is claimed is:

1. A load cell which comprises:
    first and second spaced rigid outer beams which are straight and essentially parallel and which respectively define corresponding first and second end areas, at least one measuring beam located between said first and second outer beams and oriented essentially in parallel with said first and second outer beams, said at least one measuring beam comprising at least one measuring area, a first connection means for connecting said first end area of said first outer beam to said measuring beam, said first connection means comprising a first connecting beam which is attached to said first end area of the first outer beam at a first joint, said first connecting beam forming an angle α relative to an imaginary plane defined by the first outer beam, a second connection means for connecting said first end area of said second outer beam to said measuring beam, said second connection means comprising a second connecting beam which is attached to said first end area of said second outer beam at a second joint, said second connecting beam forming an angle α relative to an imaginary plane defined by the second outer beam, a third connection means for connecting said second end area of said first outer beam to said measuring beam, said third connection means including a third connecting beam which is attached to said second end area of the first outer beam at a third joint, said third connecting beam forming an angle α relative to said imaginary plane defined by said first outer beam, and a fourth connection means for connecting said second end area of said second outer beam to said measuring beam, said fourth connecting means including a fourth connecting beam which is attached to said second end area of said second outer beam at a fourth joint, said fourth connecting beam forming an angle α relative to said imaginary plane defined by said second outer beam, application of a perpendicular force to one of said first and second outer-beams creating a load on said at least one measuring area which is greater, smaller or the same as said perpendicular force in accordance with said angle α.

2. A load cell according to claim 1, wherein said load cell comprises an integral body having portions removed to define said first and second outer beams; said at least one measuring beam; said first, second, third and fourth connection means; and said first, second, third and fourth joints.

3. A load cell according to claim 2, wherein said at least one measuring area comprises an area of reduced thickness in a width direction about a centre of said at least one measuring area.

4. A load cell according to claim 2, wherein at least one of the joints is flexible.

5. A load cell according to claim 1, wherein at least one or said first, second, third, and fourth joints is flexible.

6. A load cell according to claim 1, including a fifth joint connecting said first and second connecting beams with said at least one measuring beam and a sixth joint connecting said third and fourth connecting beams with said at least one measuring beam.

7. A load cell according to claim 6, wherein at least one of said first, second, third, fourth, fifth and sixth joints is flexible.

8. A load cell according to claim 1, wherein said at least one measuring beam is longer than said first and second outer beams and comprises a at least two measuring areas.

9. A load cell according to claim 1, including a measuring means arranged on said at least one measuring area/areas.

10. A load cell according to claim 9, wherein the measuring means consists of one or more strain gauges.

11. A load cell according to claim 9, wherein the measuring means consists of one or more piezo-electric devices.

12. A load cell according to claim 9, wherein the measuring means comprises a magnetoelastic sensor.

13. A load cell which comprises:

first and second spaced rigid outer beams which are straight and essentially parallel and which respectively define corresponding first and second end areas, first and second measuring beams located between said first and second outer beams, said first and second measuring beams being aligned essentially in parallel with said first and second outer beams, and a membrane connecting said first and second measuring beams, said first and second measuring beams comprising respective first and second measuring areas, a first connection means for connecting said first end area of said first outer beam to said first measuring beam, said first connection means comprising a first connecting beam which is attached to said first end area of the first outer beam at a first joint, said first connecting beam forming an angle α relative to an imaginary plane defined by the first outer beam, a second connection means for connecting said first end area of said second outer beam to said first measuring beam, said second connection means comprising a second connecting beam which is attached to said first end area of said second outer beam at a second joint, said second connecting beam forming an angle α relative to an imaginary plane defined by the second outer beam, a third connection means for connecting said second end area of said first outer beam with said second measuring beam, said third connection means including a third connecting beam which is attached to said second end area of said first outer beam at a third joint, said third connecting beam forming an angle α relative to said imaginary plane defined by said first outer beam, and a fourth connection means for connecting said second end area of said second outer beam with said second measuring beam, said fourth connection means comprising a fourth connecting beam which is connected to said second end area of said second outer beam at a fourth joint, said fourth connecting beam forming an angle α relative to said imaginary plane defined by said second outer beam, application of a perpendicular force to one of said first and second outer beams creating a load on said first and second measuring areas which is greater, smaller or the same as said perpendicular force in accordance with said angle α.

14. A load cell according to claim 13, comprising an integral body having portions removed to provide said first and second outer beams, said first and second measuring beams with respective first and second measuring areas, said membrane, and said first, second, third and fourth joints.

15. A load cell according to claim 14, wherein the measuring area/areas comprises an area of reduced thickness in a width direction about a center of the measuring area/areas.

16. A load cell according to claim 13, wherein at least one of said first, second, third and fourth joints is flexible.

17. A load cell according to claim 13, including a first stiffening beam connecting said first measuring beam with said second outer beam and a second stiffening beam connecting said second measuring beam with said first outer beam.

18. A load cell according to claim 17, including a fifth joint in said first measuring beam between said first measuring area and said first stiffening beam, and a sixth joint in said second measuring beam between said second measuring area and said second stiffening beam.

19. A load cell according to claim 13, wherein at least one of said fifth and sixth joints is flexible.

20. A load cell according to claim 13, including at least one T-shaped connection means for connecting said first and second connecting beams to said first measuring beam, said at least one T-shaped connection means being connected to said first connecting beam at a seventh joint, to said second connecting beam at an eight joint and to said first measuring beam at a ninth joint.

21. A load cell according to claim 20, including a further T-shaped connection means for connecting said third and fourth connecting beams to said second measuring beam, said further T-shaped connection means being connected to said third connecting beam at a tenth joint, to said fourth connecting beam at an eleventh joint, and to said second measuring beam at a twelfth joint.

22. A load cell according to claim 21, wherein at least one of said first, second, third, fourth, fifth sixth, seventh, eighth, ninth, tenth, eleventh and twelfth joints is flexible.

23. A load cell according to claim 13, including a measuring means arranged on said first measuring area/areas.

24. A load cell according to claim 23, wherein the measuring means consists of one or more strain gauges.

25. A load cell according to claim 23, wherein the measuring means consists of one or more piezo-electric devices.

26. A load cell according to claim 23, wherein the measuring means comprises a magnetoelastic sensor.

* * * * *